United States Patent
Hamilton et al.

(10) Patent No.: US 7,165,172 B1
(45) Date of Patent: Jan. 16, 2007

(54) FACILITATING COLD RESET AND WARM RESET TASKING IN A COMPUTER SYSTEM

(75) Inventors: Thomas H. Hamilton, Manor, TX (US); Robert G. Harteker, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 450 days.

(21) Appl. No.: 10/676,600

(22) Filed: Oct. 1, 2003

(51) Int. Cl.
G06F 12/00 (2006.01)
(52) U.S. Cl. .............................................. 713/1; 713/2
(58) Field of Classification Search .................... 713/1, 713/2
See application file for complete search history.

(56) References Cited

U.S. PATENT DOCUMENTS

| | | | | |
|---|---|---|---|---|
| 6,065,074 | A * | 5/2000 | Minamizawa | 710/54 |
| 6,748,515 | B1 * | 6/2004 | Hendrickson et al. | 712/32 |
| 6,795,927 | B1 * | 9/2004 | Altmejd et al. | 713/300 |
| 2003/0018691 | A1 * | 1/2003 | Bono | 709/106 |
| 2003/0061526 | A1 * | 3/2003 | Hashimoto | 713/320 |
| 2004/0098722 | A1 * | 5/2004 | Funaki et al. | 718/103 |
| 2004/0103331 | A1 * | 5/2004 | Cooper | 713/323 |

OTHER PUBLICATIONS

AMD, BIOS and Kernel Developer's Guide for AMD Athlon™ 64 and AMD Operton™ Processors, Publication #26094, Revision 3.06, Sep. 2003, 9 pages.
AMD, AMD-8111™ HyperTransport™ I/O Hub, Data Sheet, Publication #24674, Revision 3.00, Apr. 2003, pp. 37-134.

* cited by examiner

*Primary Examiner*—A. Elamin
(74) *Attorney, Agent, or Firm*—Lawrence J. Merkel; Meyertons, Hood, Kivlin, Kowert & Goetzel, P.C.

(57) ABSTRACT

In response to a cold reset in a computer system, a plurality of indications in a nonvolatile memory are initialized to a first state. Each of the plurality of indications is assigned to a respective one of a plurality of tasks to be executed on one or more processors of the computer system. A first task of the plurality of tasks is executed, including changing a first indication of the plurality of indications to a second state, wherein the first indication is assigned to the first task. A computer accessible medium comprising one or more instructions implementing the initialization and one or more instructions comprise the first task is also contemplated, as well as a computer system including a processor and the computer accessible medium.

22 Claims, 3 Drawing Sheets

FACILITATING COLD RESET AND WARM RESET TASKING IN A COMPUTER SYSTEM

BACKGROUND OF THE INVENTION

1. Field of the Invention

This invention is related to software in a computer system (e.g. Basic Input Output System, or BIOS, software) that executes in response to a reset of the computer system.

2. Description of the Related Art

Generally, a computer system may include one or more processors, various integrated circuits, and other devices. When the computer system is powered on, the computer system is reset, thus providing an initial state of the computer system. Then, Basic Input/Output System (BIOS) code is executed to determine the resources of the computer system (e.g. memory, disk drives, keyboard, mouse, etc.), perform various checks on the resources, and enable the resources in the computer system so that operating system software can be loaded from disk and executed. The BIOS code is typically stored in a nonvolatile memory (typically a read only memory (ROM) or a Flash memory), so that the code can be fetched by the processor and executed before most computer system resources are enabled for use.

There may be two types of resets of a processor in a computer system, a "warm reset" and a "cold reset". Generally, a reset may cause the processor (and other circuits and/or devices that are reset) to establish a known state. A "cold reset" occurs when the computer system is powered on (i.e. when the power supply is turned on and begins supplying voltage to the processor and other circuitry). In a cold reset, all circuitry is reset to a predefined state. On the other hand, a "warm reset" is initiated with the power supply already supplying power to the processor and other circuitry, and after the processor or other circuitry has begun operating (e.g. after the processor has started executing instructions). In a warm reset, at least some of the pre-reset state is retained after the warm reset occurs, while the remaining state is reset to a predefined state. Warm resets may be initiated by hardware, and often may be initiated by software as well (e.g. by writing to a specified register, I/O port, etc.).

The BIOS code may generally be divided into a set of tasks. Each task may perform a defined function (e.g. detect and configure a resource, check for errors in a self-test of the resource, etc.), and generally is intended to run once as a result of a cold reset. However, various tasks may require a warm reset to complete their defined function (e.g. for a configuration to take effect). During development of a computer system (and sometimes after the computer system has been installed in a customer's location), the BIOS code may be modified. Which tasks require a warm reset and which do not require a warm reset may change. Furthermore, it may be desirable to change the order of the tasks.

Typically, a processor may provide an indication of its reset state, permitting software (e.g. BIOS code) to detect whether a warm reset or a cold reset has occurred. The processor may change the indication in different ways in response to a cold reset or a warm reset. The BIOS code may change the indication as well. Particularly, a given task may change the indication to indicate that the task has completed.

Unfortunately, it is difficult for the various tasks to share the processor's indication of reset state. Once one task changes the indication, the indication may not be useful for subsequent executing tasks. In the past, the tasks were forced into a particular order, and only the last task in the order may cause a warm reset.

SUMMARY OF THE INVENTION

A method is contemplated. In response to a cold reset in a computer system, a plurality of indications in a nonvolatile memory are initialized to a first state. Each of the plurality of indications is assigned to a respective one of a plurality of tasks to be executed on one or more processors of the computer system. A first task of the plurality of tasks is executed, including changing a first indication of the plurality of indications to a second state, wherein the first indication is assigned to the first task. A computer accessible medium comprising one or more instructions implementing the initialization and one or more instructions comprise the first task is also contemplated, as well as a computer system including a processor and the computer accessible medium.

BRIEF DESCRIPTION OF THE DRAWINGS

The following detailed description makes reference to the accompanying drawings, which are now briefly described.

Figure 1:
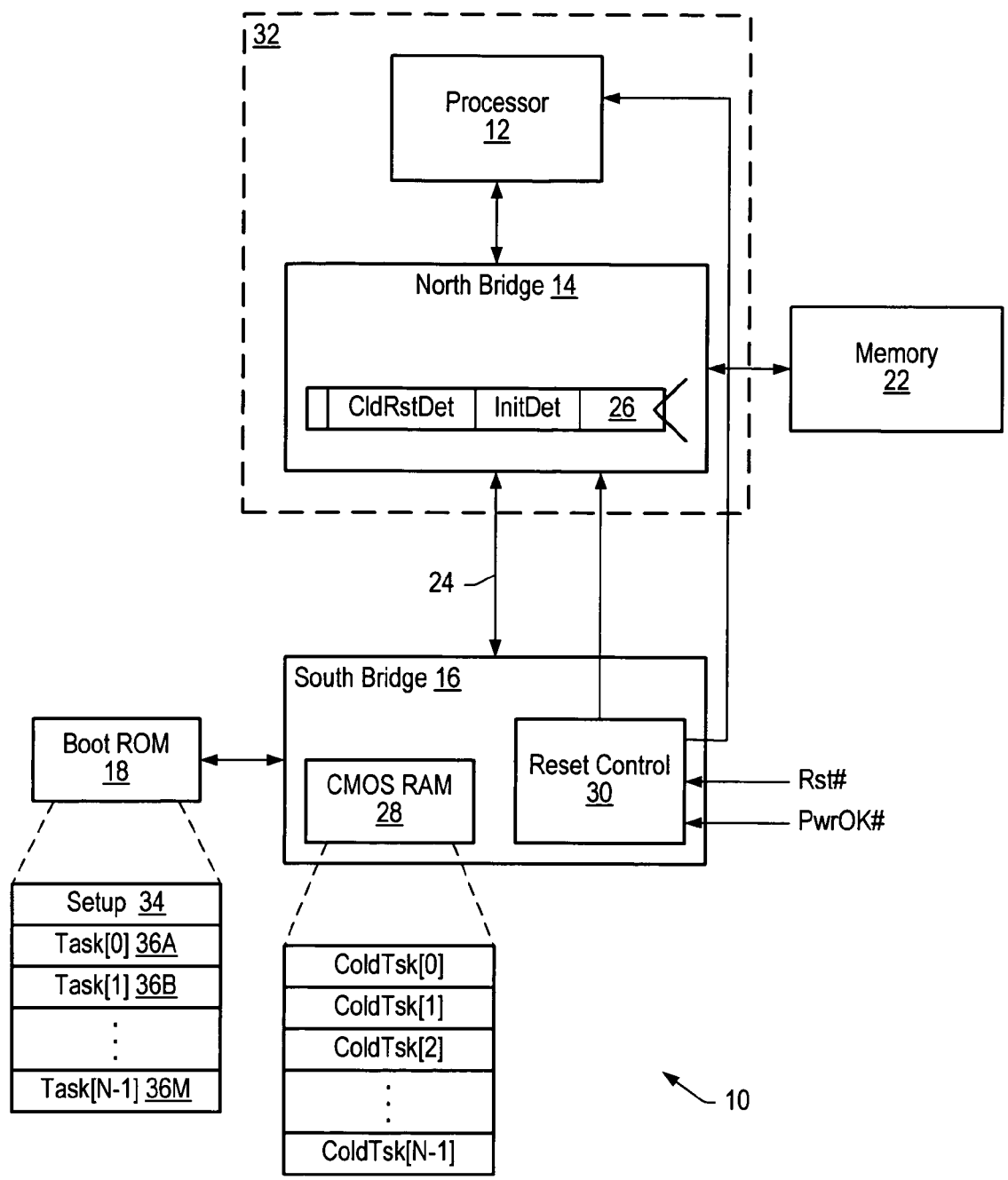
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The description below refers to various bits, with the set state of the bit having a first predefined meaning and the clear state having a second predefined meaning. In other embodiments, the meanings may be reversed (i.e. the set state may have the second predefined meaning and the clear state may have the first predefined meaning. Alternatively, multi-bit indications may be used, where a first state of the indication has the first predefined meaning and a second state of the indication has the second predefined meaning. For example, the ColdTsk[i] bits are described, with the set state of a given ColdTsk[i] bit indicating that the corresponding task has not been executed and the clear state indicating that the corresponding task has been executed (in response to the most recent cold reset). However, in other embodiments, the set state of the ColdTsk[i] bit may indicate that the corresponding task has been executed and the clear state indicating that the corresponding task has not been executed. In still other embodiments, each ColdTsk[i] may be a multi-bit indication with a first state of the indication indicating that the corresponding task has not been executed and the second state of the indication indicating that the corresponding task has been executed. Similarly, each of the CldRstDet and InitDet bits are described, with the north bridge 14 establishing a clear state for one or both of the bits in response to resets and the BIOS code setting one or both of the bits at various times. Alternatively, the north bridge 14 may establish set states for one or both of the bits in response to resets and the BIOS code may clear one or both of the bits at various times. In yet another alternative, multi-bit indications may be used with a first state being established by the north bridge 14 in one or both of the CldRstDet indication and the InitDet indication in response to resets, and the BIOS code establishing a second state in one or both of the CldRstDet indication and the InitDet indication at various times.

Turning now to FIG. 1, a block diagram of one embodiment of a computer system 10 is shown. In the embodiment of FIG. 1, the computer system 10 includes a processor 12, a north bridge 14, a south bridge 16, a boot ROM 18, and a memory 22. The processor 12 is coupled to the north bridge 14, which is further coupled to the memory 22. The north bridge 14 is further coupled to the south bridge 16 via a peripheral interface 24. The south bridge 16 is coupled to the boot ROM 18. In the illustrated embodiment, the north bridge 14 includes a register 26 which includes a CldRstDet bit and an InitDet bit. In the illustrated embodiment, the south bridge 16 includes a complementary metal-oxide-semiconductor (CMOS) random access memory (RAM) 28 and a reset control circuit 30 that is coupled to receive a reset signal (Rst#) and a power ok signal (PwrOK#), and is coupled to provide resets to the processor 12 and the north bridge 14 (along with any other circuitry that may require reset, in various embodiments). In one implementation, the north bridge 14 and the processor 12 may be integrated onto one integrated circuit (illustrated by dashed block 32). In other implementations, the processor 12 and the north bridge 14 may be separate integrated circuits.

The boot ROM 18 stores the instruction code to be executed by the processor 12 in response to a reset (e.g. including the BIOS code). The contents of the boot ROM 18 for one embodiment are shown in exploded view in FIG. 1, and include setup code 34 and a plurality of tasks 36A–36M (e.g. Task[0] 36A, Task[1] 36B, and Task[N−1] 36M are illustrated in FIG. 1). Any number of tasks 36A–36M may be included in various embodiments. Each of the setup code 34 and the tasks 36A–36M comprise one or more instructions which, when executed (e.g. by the processor 12), implement the functions defined for that code/task. The CMOS RAM 28 stores a ColdTsk bit corresponding to each of the tasks 36A–36M. More particularly, a given ColdTsk bit enumerated "i" (i.e. ColdTsk[i]) is assigned to the like-enumerated task 36A–36M (i.e. Task[i]). That is, ColdTsk[0] is assigned to Task[0], ColdTsk[1] is assigned to Task[1], etc.

Generally, the boot ROM 18 may be located in the address space of the computer system 10 at an address from which the processor 12 begins fetching instructions in response to a reset. The setup code 34 may execute prior to the tasks 36A–36M, in response to a reset. If the reset is a cold reset, the setup code 34 initializes the ColdTsk[i] bits, setting each bit. The tasks 36A–36M may then be executed, and each task 36A–36M may reset its assigned ColdTsk[i] bit upon completing its assigned function. Prior to executing, each task 36A–36M may check its assigned ColdTsk[i] bit to ensure that it has not already executed. For example, if one or more warm resets are initiated after a given Task[i] has executed, that Task[i] will be called again after each warm reset. By checking the ColdTsk[i] bit prior to executing (and exiting if the ColdTsk[i] bit is clear), the Task[i] may ensure that it is only executed once in response to the cold reset (even if warm resets occur before the Task[i] executes the first time, after the Task[i] executes for the first time, or both).

Since the execution of each task is controlled by its corresponding ColdTsk[i] bit, the tasks 36A–36M may, in some embodiments, be reordered during the development process as desired. At any given time, the tasks 36A–36M may executed in a particular order, but the order may be changed. Furthermore, there may be more freedom in causing warm resets in the various tasks 36A–36M. If a given task 36A–36M requires a warm reset, that task may cause the warm reset (e.g. after clearing the corresponding ColdTsk[i] bit). Any task may cause a warm reset, and any number of warm resets may occur prior to all of the tasks 36A–36M completing.

Each of the boot ROM 18 and the CMOS RAM 28 may be examples of a nonvolatile memory. Generally, a nonvolatile memory may include any memory which retains its state when the power to the computer system 10 is turned off (i.e. is not supplying voltage to the south bride 16 and other circuitry in the computer system 10). For example, the CMOS RAM 28 may be a RAM which is powered by a battery, and thus the RAM may remain powered when the power to computer system 10 is turned off. The Boot ROM may be a fixed ROM, or may be any of a variety of programmable ROMs (PROMs). PROMs may include flash memory, erasable PROMs (EPROMs), electrically erasable PROMs (EEPROMs), etc. Any nonvolatile memories may be used to store the setup code 34, the tasks 36A–36M, and/or the ColdTsk[i] bits. Furthermore, embodiments are contemplated in which the setup code 34, the tasks 36A–36M, and the ColdTsk[i] bits are all stored in the same nonvolatile memory.

As used herein, a "task" may be one or more instructions which, when executed, perform a predefined function (or functions) that is to be performed in response to a cold reset. A given task may be associated with a computer system 10 resource, and that task may initialize the resource and enable it for use. For example, a resource to which a task may be associated may include an I/O device such as the keyboard, the mouse, a disk drive, the video display, other user interface devices such as tablets, etc. A resource may also include a class of I/O devices (e.g. universal serial bus (USB) devices, peripheral component interconnect (PCI) devices, etc.). A resource may include an integrated circuit in the computer system 10 or a portion thereof (e.g. the north bridge 14, the south bridge 16, or portions thereof such as the PCI configuration in the north bridge 14, the memory controller in the north bridge 14 (and the associated memory 22), the AGP configuration in the north bridge 14 if applicable, the PCI configuration in the south bridge 16, other interface configurations in the south bridge 16, etc.). The term "tasks" may also refer to tasks that perform testing of various resources to ensure that they are functioning properly, or tasks which check built-in self-test (BIST) codes provided by BIST hardware and handle any reported errors.

The register 26 in the north bridge 14 includes a CldRstDet bit and an InitDet bit. These bits may be modified by the north bridge 14 hardware in response to resets, and may also be read and/or written by code executing on the processor 12 (e.g. the setup code 34 and/or the tasks 36A–36M). That is, the register 26 may be addressable by code executing on the processor 12. For example, the register 26 may exist in the PCI address space, in one embodiment. In one specific implementation, the register 26 may be addressed as function 0, offset 6c (in hexadecimal). The CldRstDet and InitDet bits may be used to detect cold and warm resets. More particularly, the north bridge 14 may clear both the CldRstDet bit and the InitDet bit in response to a cold reset. The north bridge 14 may clear the InitDet bit, but not the CldRstDet bit, in response to a warm reset. That is, the state of the CldRstDet bit in the register 26 may be maintained across a warm reset.

In the illustrated embodiment, the south bridge 16 also includes the reset control circuit 30, which may control the reset of the processor 12, the north bridge 14, other parts of the south bridge 16, and any other portions of the computer system 10 that are to be reset. The reset control circuit 30 may cause warm and cold resets in one or more of the processor 12, the north bridge 14 in response to the signalled cold and warm resets.

In the illustrated embodiment, the Rst# and PwrOK# signals are used to signal resets. A cold reset may be signaled by asserting the Rst signal# and the PwrOK# signal. A warm reset may be signaled by asserting the Rst# signal with the PwrOK# signal deasserted. In this embodiment, the Rst# and PwrOK# signals are defined to be asserted when driven to a logical low (e.g. a ground voltage) and deasserted when driven to a logical high (e.g. a power supply voltage). Other embodiments may define asserted and deasserted for one or both signals as the reverse of the preceding definitions. Furthermore, other embodiments may signal cold and warm resets in any desired fashion (e.g. separate cold reset and warm reset signals may be used). While the reset control circuit 30 is included in the south bridge 16 in the embodiment of FIG. 1, the reset control circuit 30 may be separate from the south bridge 16 in other embodiments, or may be located elsewhere in the computer system 10 (e.g. the north bridge 14 or the processor 12).

The processor 12 may generally include the circuitry for executing instructions defined in an instruction set implemented by the processor 12. For example, in some embodiments, the processor 12 may implement the x86 instruction set (also known as the IA-32 instruction set). The instruction set may include the floating point instructions (x87), multimedia extensions (MMX), the streaming single instruction, multiple data extensions (SSE), the 3DNow!™ instructions, etc., as desired. In some implementations, the processor 12 may also implement the x86-64 extensions from Advanced Micro Devices, Inc. Other instruction sets may also be implemented (e.g. PowerPC, ARM, Sparc, MIPS, etc.).

The north bridge 14 may include circuitry for interfacing to the processor 12 (and additional processors 12, if more than one processor 12 is included), the memory 22, the and the peripheral interface 24, to facilitate communications among the memory 22, the processor 12, and the devices coupled to the peripheral interface 24 (e.g. the south bridge 16). In some embodiments, the north bridge 14 may further include circuitry for interfacing to an advanced graphics port (AGP) device. The south bridge 16 may include circuitry to bridge between the peripheral interface 24 and various other interfaces (e.g. the interface to the boot ROM 18, as well as a variety of other interfaces (often referred to as "legacy" interfaces in personal computers, such as the industry standard bus (ISA), the enhanced ISA bus (EISA), etc. The south bridge 16 may also contain various other logic, such as the reset control circuit 30, power management circuitry controlling power management features of the computer system 10, and other legacy circuitry, in some embodiments.

The peripheral interface 24 may be the PCI bus, in some embodiments. In other embodiments, other interfaces may be used. For example, the HyperTransport™ interface may be used.

The memory 22 may comprise any RAM memory. For example, various types of dynamic RAM (DRAM) such as synchronous DRAM (SDRAM), double data rate SDRAM (DDR SDRAM), Rambus DRAM (RDRAM), etc. may be used. The memory 22 may be organized into multiple banks, if desired.

It is noted that, while the CMOS RAM 28 is shown in FIG. 1 as part of the south bridge 16, the CMOS RAM 28 may be external to the south bridge 16 in other embodiments. Furthermore, the CMOS RAM 28 may be coupled into the computer system 10 at other points (e.g. to the peripheral interface 24, to the north bridge 14, to the interface between the processor 12 and the north bridge 14, etc.). Similarly, the boot ROM 18 may be coupled into the computer system 10 at other points (e.g. to the peripheral interface 24, to the north bridge 14, to the interface between the processor 12 and the north bridge 14, etc.). As mentioned above, the CMOS RAM 28 and/or the boot ROM 18 may be any nonvolatile memories, in various embodiments. While the CMOS RAM and/or the boot ROM 18 may have a legacy context, embodiments in which the nonvolatile memories have no legacy context are also contemplated. It is noted that the register 26, while illustrated as part of the north bridge in FIG. 1, may be located elsewhere in other embodiments. For example, the register 26 may be located in the processor 10. It is noted that, while the ColdTsk[i] bits are illustrated in exploded form in FIG. 1 as individual bits, the bits may be accessed by the processor 12 from the CMOS RAM 28 in groups of 8 as a byte (or in larger groups as a word, double word, etc.).

While the setup code 34 and the tasks 36A–36M are illustrated in the boot ROM 18 and the ColdTsk[i] bits are illustrated in the CMOS RAM 28 in FIG. 1, the setup code 34 and/or the tasks 36A–36M may be stored on any computer readable medium. The ColdTsk[i] bits may be stored on any computer read/write medium (including a read/write medium also storing the setup code 34 and/or the tasks 36A–36M). The boot ROM 18 and the CMOS RAM 28 may be examples of computer readable media. Additionally, for example, the setup code 34 and/or one or more tasks 36A–36M may be stored on other computer readable media (e.g. storage media). The code may be stored on such other computer readable media, for example, to transport the code to the computer system 10 for installation in the boot ROM 18 or other non-volatile memory. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The term computer accessible medium may encompass the term computer readable medium and/or the term computer read/write medium.

Figure 2:
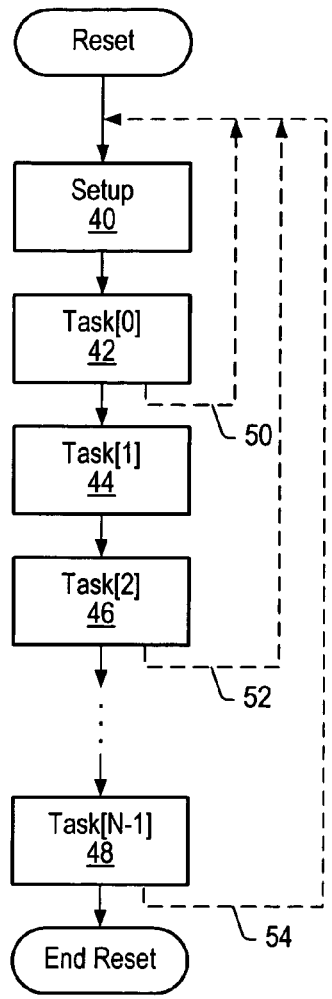
FIG. 2 is a flowchart illustrating one embodiment of a set of tasks that may execute in response to a reset in the computer system.

Turning now to FIG. 2, a flowchart is shown illustrating execution of a set of tasks in response to a reset according to one embodiment. While the blocks are shown in a particular order in FIG. 2, other orders may be used. Particularly, various orders of the tasks may be used (e.g. they need not be executed in numerical order, and Task[N−1] need not be the last task executed).

In response to a reset (warm or cold), the setup code 34 may be executed (block 40). Subsequently, one or more tasks may be executed (blocks 42–48). Some of the tasks may cause a warm reset (illustrated, e.g., by dotted lines 50, 52, and 54 from blocks 42, 46, and 48, respectively). A warm reset causes flow to return (after the reset is complete) to the top of the flowchart in FIG. 2 (i.e. the processor 12 may begin fetching again after each reset at the same address, which leads to fetching the setup code 34 again—block 40).

A given task may cause a warm reset in any fashion. For example, a register may be defined (e.g. in the reset control circuit 30) that may be written by software to cause a warm reset. The register may be addressed in any fashion. Alternatively, a write to a defined I/O port may be used to cause a warm reset. The write to the I/O port may signal a warm reset. The register or I/O port may also be located at the source of the Rst# signal (not shown), and the warm reset may be initiated via assertion of the Rst# signal.

Figure 3:
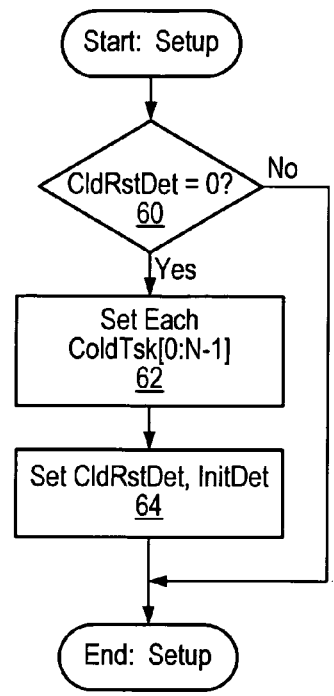
FIG. 3 is a flowchart illustrating one embodiment of a setup code sequence.

Turning now to FIG. 3, a flowchart is shown illustrating one embodiment of the setup code 34. That is, the flowchart of FIG. 3 may represent the function achieved in the computer system 10 in response to executing the one or more instructions forming the setup code 34. While the blocks are shown in a particular order in FIG. 3, other orders may be used.

The setup code 34 may read the CldRstDet bit from the register 26. If the CldRstDet bit is clear (decision block 60—"yes" leg), then a cold reset has occurred. The setup code 34 may set each ColdTsk bit (e.g. bits 0 to N−1) (block 62). Additionally, the setup code 34 may set the CldRstDet bit and the InitDet bit in the register 26 (block 64). Since the CldRstDet bit is not cleared by the north bridge 14 in response to a warm reset, setting the CldRstDet bit ensures that subsequent warm resets are not detected as being a cold reset. Additionally, setting the InitDet bit permits detecting whether or not at least one warm reset has occurred. A given task may check the InitDet bit, and if the bit is still set, then a warm reset has not yet occurred.

If the CldRstDet bit is set (decision block 60—"no" leg) then a cold reset has not been detected. That is, the setup code 34 is being executed in response to a warm reset (e.g. execution has returned to the top of the flowchart in FIG. 2 via one of the dotted arrows 50–54 in FIG. 2). The setup code 34 may exit without modifying the ColdTsk[i] bits or the CldRstDet and InitDet bits.

Figure 4:
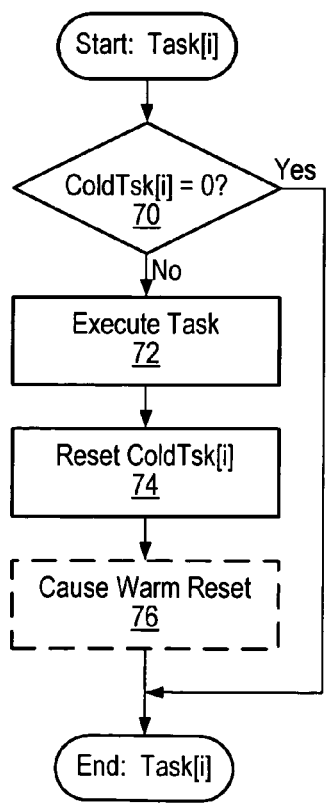
FIG. 4 is a flowchart illustrating one embodiment of a generic task code sequence.

Turning now to FIG. 4, a flowchart is shown illustrating one embodiment of a generic task (Task[i]). That is, the flowchart of FIG. 4 may represent the function achieved in the computer system 10 in response to executing the one or more instructions forming the generic task Task[i]. While the blocks are shown in a particular order in FIG. 4, other orders may be used.

The Task[i] may first check the ColdTsk[i] bit assigned to Task[i], to determine if Task[i] has already executed in response to the cold reset. If the ColdTsk[i] bit is clear (decision block 70—"yes" leg), then the Task[i] has already been executed and the Task[i] exits without further execution of the Task[i]. If the ColdTsk[i] bit is set (decision block 70—"no" leg), then the Task[i] has not yet executed. The Task[i] performs its defined task (block 72), and resets its ColdTsk[i] bit (block 74). Optionally, if the Task[i] requires a warm reset, the Task[i] may cause the warm reset (block 76).

Figure 5:
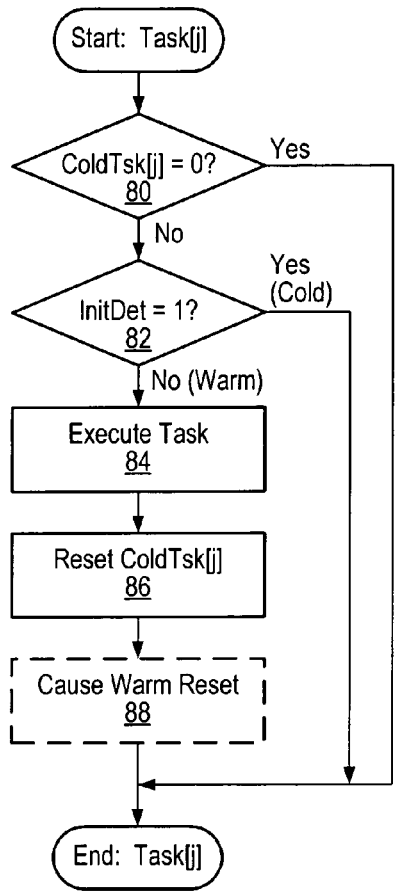
FIG. 5 is a flowchart illustrating a second embodiment of a generic task code sequence.

The embodiment of FIG. 4 is a generic task that executes once in response to a cold reset, and the task may execute regardless of whether a warm reset has occurred or not. Some tasks may be designed to execute only after a warm reset has occurred. FIG. 5 is a flowchart illustrating a second embodiment of a generic task (Task[j]) that is to execute if a warm reset has already occurred. That is, the flowchart of FIG. 5 may represent the function achieved in the computer system 10 in response to executing the one or more instructions forming the generic task Task[j]. While the blocks are shown in a particular order in FIG. 5, other orders may be used.

Similar to the embodiment of FIG. 4, the Task[j] in FIG. 5 may check the ColdTsk[j] bit assigned to Task[j] to determine if the Task[j] has previously executed, and the Task[j] may exit without further execution of Task[j] if it has previously executed (decision block 80—"yes" leg). If the Task[j] has not previous executed (decision block 80—"no" leg), the Task[j] may read the InitDet bit from the register 26. If the InitDet bit is set (decision block 82—"yes" leg) then the Task[j] is being executed in response to a cold reset and no warm reset has occurred as yet. Again, the Task[j] may exit without further execution of Task[j]. On the other hand, if the InitDet bit is clear (decision block 82—"no" leg), then a warm reset has occurred. In this case, the Task[j] may perform its defined task (block 84), and resets its ColdTsk[j] bit (block 86). Optionally, if the Task[j] requires a warm reset, the Task[j] may cause the warm reset (block 88).

It is noted that it may be desirable to have a task that executes only if a warm reset has not yet occurred. A generic task of this sort may be similar to FIG. 5, except that blocks 84, 86, and 88 may be performed on the "yes" leg of decision block 82. The "no" leg of decision block 82 would lead to exiting the task without further execution of the task. It is also possible that a task may execute differently dependent on whether or not a warm reset has occurred. Such a task may be similar to FIG. 5, except that both the "yes" and "no" legs of decision block 82 would include task execution blocks (which differ in some fashion) and clearing of the ColdTsk[j] bit. Some of the instruction code may be common to both the "yes" and "no" legs, and thus the legs may rejoin (e.g. the code to clear the ColdTsk[j] bit may be common to both legs). It is further contemplated that a given task may include both a portion to be performed in response to a cold reset and a portion to be performed in response to a warm reset. Such a task may only clear the ColdTsk[j] bit after performing both portions (e.g. in the warm reset portion). Alternatively, an embodiment may include a set of WarmTsk[j] bits. In such an embodiment, the setup code 34 may set the WarmTsk[j] bits in response to a cold reset, similar to the ColdTsk[j] bits. The ColdTsk[j] bit may be cleared after executing the cold reset portion of Task[j], and the WarmTsk[j] bit may be cleared after executing the warm reset portion of Task[j]. The WarmTsk[j] bit may be tested, e.g., on the "yes" leg of decision block 80.

A task or tasks that execute without regard to whether a warm reset has occurred and a task or tasks that execute only after a warm reset has occurred may be used together to accomplish desired results. For example, in one embodiment, the processor 12 may perform BIST in response to a reset (whether cold or warm). The result of the BIST may be stored in a general purpose register of the processor 12. It may be desirable to save the BIST result, so that it may be examined after the computer system 10 has been successfully booted (if possible). Additionally, it is possible for the BIST result to be different after a warm reset as compared to a cold reset. For example, the cold reset BIST may detect that there is a defect in a processor 12 memory array (e.g. a cache). However, the processor 12 may be configurable to boot without the memory array being enabled, or with the memory array being enabled but the defective portion disabled (e.g. by using redundant array rows and/or columns to "map out" the defective portion). A task may configure the processor 12 appropriately, and cause a warm reset. The BIST running on the disabled or partially enabled memory array after the warm reset may not detect the error in the memory array. Another error may be detected, or no error may be detected. However, after successfully booting, software (e.g. the operating system) may wish to access the cold reset and warm reset BIST results to diagnose the failure.

Figure 6:
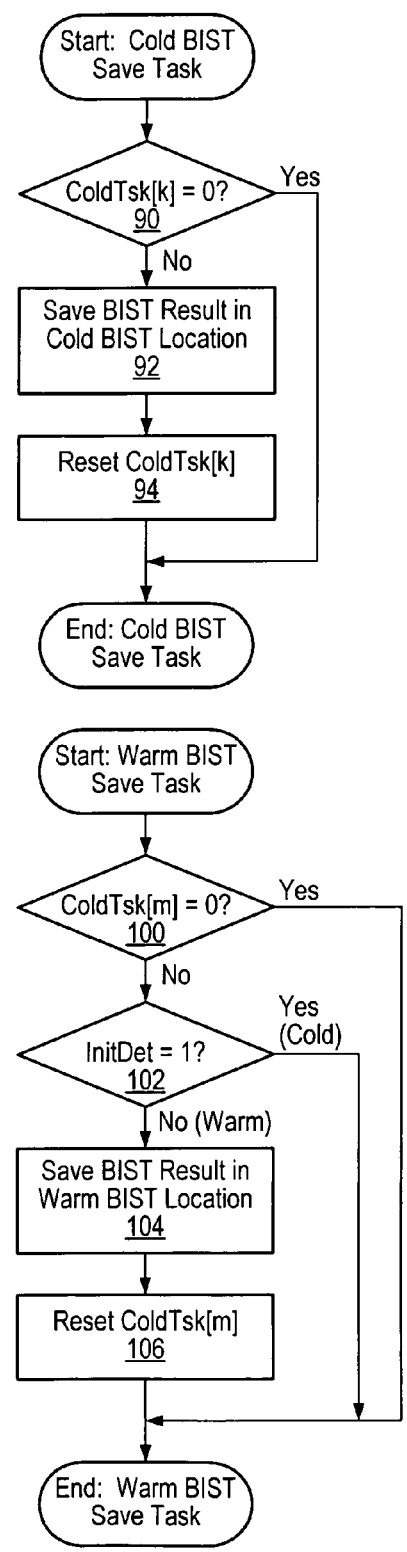
FIG. 6 is a flowchart illustrating an example of two task code sequences included in one embodiment of recoding Built-In Self-Test (BIST) codes.

The cold reset BIST result and warm reset BIST result may be saved for later software by storing the results in nonvolatile memory (e.g. in locations of the CMOS RAM 28 that are not being used to store the ColdTsk[i] bits). A task that executes without regard to whether a warm reset has occurred (a "cold BIST save" task) may be used with a second task that executes only if a warm reset has occurred (a "warm BIST save" task) to save the cold reset and warm reset BIST results. FIG. 6 is a pair of flowcharts illustrating the cold BIST save task and the warm BIST save task. The cold BIST save task is Task[k] in this example, and warm BIST save task is Task[m] in this example.

The cold BIST save task checks ColdTsk[k] to determine if the cold BIST save task has already been executed in response to the cold reset. If the ColdTsk[k] bit is clear (decision block 90—"yes" leg), then the cold BIST save task exits without further execution of the cold BIST save task. If the ColdTsk[k] bit is set (decision block 90—"no" leg), then the cold BIST save task saves the BIST result in a storage location of the CMOS RAM 28 that is reserved for the cold BIST result (block 92). Additionally, the cold BIST save task clears ColdTsk[k] (block 94) and exits.

The warm BIST save task checks ColdTsk[m] to determine if the warm BIST save task has already been executed in response to the cold reset. If the ColdTsk[m] bit is clear (decision block 100—"yes" leg), then the warm BIST save task exits without further execution of the warm BIST save task. If the ColdTsk[k] bit is set (decision block 100—"no" leg), then the warm BIST save task checks the InitDet bit in the register 26. If the Initdet bit is set (decision block 102—"yes" leg), then a warm reset has not yet occurred and thus the warm BIST save task exits without further execution of the warm BIST save task. On the other hand, if the InitDet bit is clear (decision block 102—"no" leg), the warm BIST save task saves the BIST result in a storage location of the CMOS RAM 28 that is reserved for the warm BIST result (block 104). Additionally, the warm BIST save task clears ColdTsk[m] (block 106) and exits.

Another task (not shown) may examine the BIST code and determine if corrective action may be taken to permit further booting (e.g. the memory array disable or partial disable described above) and may cause a warm reset if corrective action is taken.

Numerous variations and modifications will become apparent to those skilled in the art once the above disclosure is fully appreciated. It is intended that the following claims be interpreted to embrace all such variations and modifications.

What is claimed is:

1. A method comprising:
   in response to a cold reset in a computer system, initializing a plurality of indications in a nonvolatile memory to a first state, wherein each of the plurality of indications is assigned to a respective one of a plurality of tasks to be executed on one or more processors of the computer system; and
   executing a first task of the plurality of tasks, the executing comprising changing a first indication of the plurality of indications to a second state, wherein the first indication is assigned to the first task.

2. The method as recited in claim 1 further comprising executing a second task of the plurality of tasks, the executing comprising changing a second indication of the plurality of indications to the second state, wherein the second indication is assigned to the second task.

3. The method as recited in claim 1 wherein the executing further comprises initially checking that the first indication is in the first state.

4. The method as recited in claim 3 wherein the executing comprises exiting the first task if the first indication is not in the first state.

5. The method as recited in claim 1 wherein the executing further comprises determining if a warm reset has occurred, and exiting the first task if the warm reset has not occurred.

6. The method as recited in claim 5 wherein the determining comprises checking a warm reset indication stored in a register in the computer system.

7. The method as recited in claim 1 wherein the executing further comprises causing a warm reset subsequent to changing the first indication.

8. The method as recited in claim 1 further comprising, in response to the cold reset, changing at least a cold reset indication and a warm reset indication in a register in the computer system.

9. The method as recited in claim 1 wherein the first state indicates that the respective one of the plurality of tasks has not yet been executed subsequent to the cold reset, and wherein the second state indicates that the first task has been executed.

10. A computer accessible medium tangibly storing instructions comprising:
    a first one or more instructions which, when executed in response to a cold reset in a computer system, initialize a plurality of indications to a first state, wherein each of the plurality of indications is assigned to a respective one of a plurality of tasks to be executed on one or more processors of the computer system; and
    a first task of the plurality of tasks comprising a second one or more instructions, wherein the second one or more instructions, when executed, change a first indication of the plurality of indications to a second state, wherein the first indication is assigned to the first task.

11. The computer accessible medium as recited in claim 10 wherein the tangibly stored instructions further comprise a third one or more instructions included in a second task of the plurality of tasks, wherein the third one or more instructions, when executed, change a second indication of the plurality of indications to the second state, wherein the second indication is assigned to the second task.

12. The computer accessible medium as recited in claim 10 wherein the first task further comprises a fourth one or more instructions which, when executed, initially check that the first indication is in the first state.

13. The computer accessible medium as recited in claim 12 wherein the fourth one or more instructions, when executed, exit the first task if the first indication is not in the first state.

14. The computer accessible medium as recited in claim 10 wherein the first task further comprises a fifth one or more instructions which, when executed, determine if a warm reset has occurred, and exit the first task if the warm reset has not occurred.

15. The computer accessible medium as recited in claim 14 wherein the fifth one or more instructions determine if the warm reset has occurred by checking a warm reset indication stored in a register in the computer system.

16. The computer accessible medium as recited in claim 10 wherein the first task further comprises a sixth one or more instructions which, when executed, cause a warm reset subsequent to changing the first indication.

17. The computer accessible medium as recited in claim 10 wherein the tangibly stored instructions further comprise a seventh one or more instructions which, when executed in response to the cold reset, change at least a cold reset indication and a warm reset indication in a register in the computer system.

18. The computer accessible medium as recited in claim 10 comprising a first medium tangibly storing comprising the first one or more instructions and the first task and a second medium tangibly storing the plurality of indications.

19. The computer accessible medium as recited in claim 18 wherein the second medium comprises a nonvolatile memory.

20. The computer accessible medium as recited in claim 10 wherein the first state indicates that the respective one of the plurality of tasks has not yet been executed subsequent to the cold reset, and wherein the second state indicates that the first task has been executed.

21. A computer system comprising:

a processor; and a computer accessible medium coupled to the processor, the computer accessible medium tangibly storing instructions comprising:

a first one or more instructions which, when executed in response to a cold reset in a computer system, initialize a plurality of indications to a first state, wherein each of the plurality of indications is assigned to a respective one of a plurality of tasks to be executed on one or more processors of the computer system; and a first task of the plurality of tasks comprising a second one or more instructions, wherein the second one or more instructions, when executed, change a first indication of the plurality of indications to a second state, wherein the first indication is assigned to the first task.

22. The computer system as recited in claim 21 wherein the first state indicates that the respective one of the plurality of tasks has not yet been executed subsequent to the cold reset, and wherein the second state indicates that the first task has been executed.

* * * * *

UNITED STATES PATENT AND TRADEMARK OFFICE
CERTIFICATE OF CORRECTION

| | | |
|---|---|---|
| PATENT NO. | : 7,165,172 B1 | Page 1 of 1 |
| APPLICATION NO. | : 10/676600 | |
| DATED | : January 16, 2007 | |
| INVENTOR(S) | : Thomas H. Hamilton and Robert G. Harteker | |

It is certified that error appears in the above-identified patent and that said Letters Patent is hereby corrected as shown below:

Claim 18, col. 11, line 16, after "tangibly storing" please delete "comprising".

Signed and Sealed this

Thirteenth Day of March, 2007

JON W. DUDAS
*Director of the United States Patent and Trademark Office*